United States Patent [19]
Zrostlik et al.

[11] 3,850,221
[45] Nov. 26, 1974

[54] TIRE CHANGING TOOL

[75] Inventors: Francis L. Zrostlik; John J. Collins, both of Garner, Iowa

[73] Assignee: Iowa Mold Tooling Co., Inc., Garner, Iowa

[22] Filed: Apr. 16, 1973

[21] Appl. No.: 351,443

[52] U.S. Cl. ............................ 157/1.33, 157/1.2
[51] Int. Cl. ............................................ B60c 25/06
[58] Field of Search ......... 157/1.11, 1.17, 1.2, 1.26, 157/1.33

[56] References Cited
UNITED STATES PATENTS

| | | | |
|---|---|---|---|
| 1,729,861 | 10/1929 | Anderson | 157/1.2 |
| 3,149,661 | 9/1964 | Pardee | 157/1.2 |
| 3,500,891 | 3/1970 | Collins | 157/1.2 |

Primary Examiner—Al Lawrence Smith
Assistant Examiner—Harold P. Smith, Jr.
Attorney, Agent, or Firm—Hofgren, Wegner, Allen, Stellman & McCord

[57] ABSTRACT

An improved tire changing tool for use in the repair or changing of pneumatic tires on vehicles having split rims. The tool includes a spider-like assemblage having a plurality of radially extending arms each of which is fitted with an adjustable pusher unit for engagement with the periphery of a split rim. The number of arms and the dimensions of the pusher unit transverse to the length of each arm is such that parts of a split rim having a diameter on the order of the diameter of the split rim are positively confined within the space defined by the arms, the pusher units and other portions of the split rim. Thus, such parts cannot fly off of split rims to strike the user of the tool to cause possible injury.

2 Claims, 3 Drawing Figures

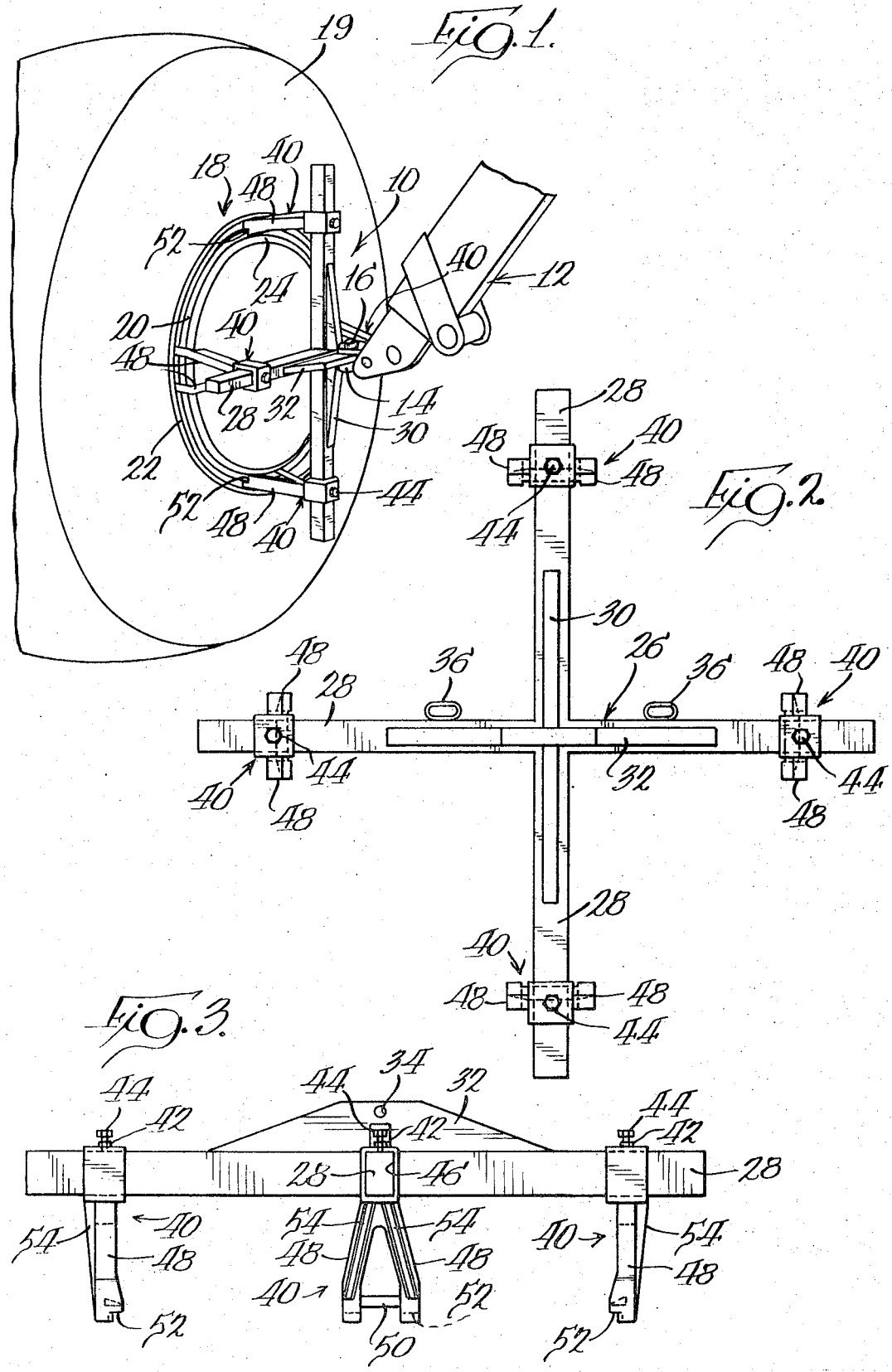

TIRE CHANGING TOOL

BACKGROUND OF THE INVENTION

This invention relates to tire changing apparatus, and more particularly, to a tire changing tool for use in repair or the changing of pneumatic tires mounted on split rims.

Many vehicles in use today employ so-called "split rims" for mounting pneumatic tires. This is particularly true where large size tires are employed. Typically, a split rim will include a main rim part having an upturned flange at one end for abutting the bead of a tire. The construction also includes a so-called "bead seat ring" having a similar upturned flange and adapted to fit concentrically about the main rim. A bead retaining ring is frequently disposed between the flange on the bead seat ring to engage the opposite sidewall or bead of the tire and, in addition, a sealing O-ring is generally located between the interface of the bead seat ring and the main rim to preclude air leakage when tubeless tires are employed. Lastly, a split retaining ring or lock ring is employed to hold the bead seat ring on the main rim under the substantial pressures applied when the tire is inflated.

Because of the forces developed when it is desired to remove or replace the locking ring or when, after the rim is assembled and the tire is to be inflated, frequently in the past, users of equipment for changing or repairing tires on split rims have been injured by the lock ring flying off of the assemblage. And, of course, if the lock ring is dislodged during the inflation process, the bead seat ring will be forced away from the main rim by the pressure applied thereto from the tire. It too can strike the user of the equipment, causing severe injury.

SUMMARY OF THE INVENTION

It is the principal object of the invention to provide a new and improved tire changing or repair tool for use in changing or repair operations performed on split rim constructions mounting pneumatic tires. More particularly, it is an object of the invention to provide such a tool which not only is useful during a changing or repair operation, but additionally is constructed so as to protect the user from parts of the split rim should they fly off of the assembly during a repair or changing operation.

The exemplary embodiment of the invention achieves the foregoing object in a construction including a spider assemblage having a plurality of radially extending arms. According to the preferred embodiment, there are four such arms and the same are equally radially spaced about the center of the spider assemblage.

Each arm slidably receives a corresponding pusher unit. Means are provided for fixing the position of each pusher unit along the length of its associated arm. Each pusher unit additionally includes a notch-like rim engaging surface. By suitably positioning the pusher units on the arms, the same may be oriented so that the rim engaging surface will overlie the flange of the bead seat ring so that the same may be depressed on the main rim to allow replacement of an O-ring seal and the replacement and/or removal of the locking ring.

The number of arms employed as well as the dimension of each pusher unit transverse to the length of the arm is such that parts of a split rim having a diameter on the order of the diameter of the rim, such as the locking ring, are wholly confined by parts of the rim, the pusher units and the arms. Thus, should they become inadvertently dislodged during a repair or changing operation, they are confined and cannot fly away from the construction to strike the user of the equipment.

Preferably, the spider assemblage is provided with backup braces for each of the arms emanating from the center of the assemblage and extending along a portion of the length of each arm.

According to the preferred embodiment, each pusher unit is an integral unit formed of a casting or the like with an aperture at one end for slidably receiving the associated arm. A pair of diverging legs extend away from the aperture and at their ends are provided with the notch-like rim engaging surface mentioned earlier.

Other objects and advantages will become apparent from the following specification taken in conjunction with the accompanying drawings.

DESCRIPTION OF THE DRAWINGS

FIG. 1 is a perspective view of a tire changing tool made according to the invention mounted on a boom and being applied to a split rim mounting a pneumatic tire;

FIG. 2 is a rear view of the tire changing tool; and

FIG. 3 is a side view of the tire changing tool.

DESCRIPTION OF THE PREFERRED EMBODIMENT

An exemplary embodiment of a tire changing tool made according to the invention is illustrated in the drawings. With reference to FIG. 1, the tool is generally designated 10 and is seen to be mounted on the end of a boom, generally designated 12 by means of a clevis 14 and associated pivot pin 16. The boom 12 may be a hydraulically operated extendable boom and typically will be mounted on a vehicle such as a service truck.

The tool 10 is illustrated in FIG. 1 as located on a split rim, generally designated 18, mounting a large, pneumatic tire 19. The split rim 18 includes a conventional bead seat ring 20, a bead retaining flange 22 associated therewith and a main rim 24. While not shown in FIG. 1, it is to be understood that a split retaining ring or lock ring is associated with the visible end of the main rim 24 to engage the beat seat ring 20 and retain the same in place.

With reference now to FIGS. 1-3, the tool 10 comprises a spider assemblage, generally designated 26, having a plurality of radially extending arms 28. In the preferred embodiment, four of the arms 28 are provided and may be fabricated of lengths of tubing having a rectangular cross section. Bracing plates 30 and 32 are located on surfaces of the tubes 28 and secured thereto to extend from the center of the spider assemblage 26 along a portion of the length of each of the arms 28. Preferably, the bracing plate 32 is provided with an aperture 34 for receipt of the pin 16 so that the same may be secured to the boom 12.

In addition, at least some of the arms 28 are provided with aperture defining means in the form of short sections of tubes 36 secured to the arms as by welding. The apertures defined by the tube ends 36 are adapted to receive the ends of a bar-like tool such as a crowbar. The added leverage provided by a crowbar inserted in either one of the tube ends 36 may be useful in manipulating the tool 10 while on the boom 12.

Each of the arms 28 receives an associated pusher unit, generally designated 40. Preferably, each pusher unit is formed as an integral unit, generally as by casting. As seen in FIG. 3, the upper surface thereof may include a neck 42 having a threaded internal opening for receiving a bolt 44. The neck 42 opens into an aperture 46 in one end of the pusher unit, which aperture is designed to slidably receive an associated one of the arms 28. It will be immediately appreciated that by tightening the bolt 44, a rigid connection may be established between the associated pusher unit 40 and the arm 28 on which it is received to lock the pusher unit at a desired location thereon. By loosening the bolt, the pusher unit may be moved to another location. This feature allows a single tool to be used in changing or repair operations on a variety of different rim sizes.

A pair of legs 48 extend downwardly in a diverging relationship from the neck 42. The legs 48 are provided with an interconnecting web 50 which serves to rigidify the two. At their lower ends, there is provided a notch-like surface 52 which is adapted to engage bead seat ring 20 of the split rim 18. Finally, integral cast webs 54 may extend along the back of the legs 48 for strengthening purposes.

As can be seen from FIG. 1, the pusher units 40 are located on the arms 28 such that the rim engaging surfaces defined by the notches 52 engage the flange on the bead seat ring 20. When such an arrangement has been accomplished, the pusher units may be locked in place by tightening the bolts 44. Force may then be applied to the center of the spider assemblage 26 as from the boom 12 and, with the tire 19 deflated, the bead seat ring will be pushed inwardly on the main rim 24 to expose the locking ring (not shown) and/or a sealing O-ring. The locking ring may then be removed in a conventional fashion. Should it occur that the locking ring springs off of the main rim 24 during this removal operation, it will be appreciated that it is completely confined in the space defined by the main rim 24, the arms 28 and the pusher units 40.

That is, the dimensions of the pusher units 40 and the number of arms 28 is such that the space between adjacent pusher units is sufficiently small that parts of the split rim having a diameter on the general order of that of the split rim cannot pass therebetween. Accordingly, should the lock ring spring off the rim 24, it will be confined so that it cannot strike the operator to cause injury.

It will also be appreciated that if after a tire has been changed or repaired and the same is being inflated after the lock ring is in place and the pressure of inflation drives the lock ring off of the main rim 24, by simply maintaining the tool 10 in the general position illustrated in FIG. 1 while not applying substantial force to the bead seat ring 20, should the lock ring slip off during the inflation process, it again will be confined, thereby precluding injury to the operator. And, of course, the bead seat ring is precluded from springing off of the assemblage to strike the user of the same by reason of its being engaged by the respective pusher units 40 at at least three different points.

From the foregoing, it will be appreciated that a repair tool made according to the invention provides the significant advantage over prior constructions of vastly increasing the safety factor attendant its use to substantially eliminate the possibility of injury to the user due to slipping lock rings and/or bead seat rings.

We claim:

1. A tire repair tool for use in the repair or changing of pneumatic tires of vehicles employing split rims; said tire repair tool including a spider assemblage having means for positively confining the parts of a split rim to prevent injury to the user of the tool comprising: four equally spaced radially extending arms, each arm having a pusher unit mounted thereon, each pusher unit including an aperture for slidable receipt of the associated arm, means for locking the pusher unit at a desired location on the associated arm, and a notch-like split rim engaging surface extending generally transverse to the axis of said aperture; brace means extending from the center of said assemblage along a portion of the length of each arm, and means for securing said assemblage to a boom, at least some of the arms including means defining tool receiving apertures extending generally transverse to the length of the associated arm so that a bar-like tool may be inserted in one of said tool receiving apertures to assist in manipulating said tire repair tool when mounted on a boom.

2. Apparatus according to claim 1 wherein each of said pusher units comprises a unitary construction having said aperture at one end and said split rim engaging surface at the other end and interconnecting diverging legs, said split rim engaging surface being located on the diverging ends of said legs and remote from said one end, and rigidifying means interconnecting said legs adjacent said split rim engaging surfaces.

* * * * *